United States Patent
Sasaki

(10) Patent No.: US 7,236,382 B2
(45) Date of Patent: Jun. 26, 2007

(54) INVERTER MODULE HAVING ENCAPSULATED RESISTORS

(75) Inventor: Shigeharu Sasaki, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/108,072

(22) Filed: Apr. 18, 2005

(65) Prior Publication Data

US 2005/0237773 A1 Oct. 27, 2005

(30) Foreign Application Priority Data

Apr. 27, 2004 (JP) ............................. 2004-131732

(51) Int. Cl.
 *H02M 7/44* (2006.01)
 *H02M 7/68* (2006.01)
(52) U.S. Cl. ............................. 363/98; 338/49; 322/27
(58) Field of Classification Search ................... 363/98; 338/49; 322/27
See application file for complete search history.

(56) References Cited

U.S. PATENT DOCUMENTS

| 5,963,442 | A | * | 10/1999 | Yoshida et al. | ................ 363/98 |
| 6,069,401 | A | * | 5/2000 | Nakamura et al. | .......... 257/676 |
| 6,794,854 | B2 | * | 9/2004 | Nakatsu et al. | ................ 322/27 |
| 6,960,980 | B2 | * | 11/2005 | Nakatsu et al. | ................ 338/49 |

FOREIGN PATENT DOCUMENTS

JP  3341327  8/2002

\* cited by examiner

*Primary Examiner*—Bao Q. Vu
(74) *Attorney, Agent, or Firm*—McDermott Will & Emery LLP

(57) ABSTRACT

An object is to provide an inverter module capable of reducing installation space, and in summary, the inverter module comprises a switching element group provided in a mold package to convert a DC voltage into a three-phase pseudo AC voltage by switching, wherein resistors to detect voltages before and after a switch connected in serial to a DC power source are integrally molded into the mold package, and wherein there are provided pins to connect the resistors before and after the switch, and pins to output terminal voltages of the resistors.

2 Claims, 3 Drawing Sheets

INVERTER MODULE HAVING ENCAPSULATED RESISTORS

BACKGROUND OF THE INVENTION

1. Field of the Invention

The present invention relates to an inverter module comprising a switching element group provided in a mold package to convert a DC voltage into a three-phase pseudo AC voltage by switching.

2. Description of the Related Art

Recently, an air conditioner equipped with an electrically driven compressor driven by a battery power source has been developed as an air conditioner for an electric automobile. This air conditioner comprises, as shown in FIG. 3, a battery (DC power source) 101, a switch 102 as a switching device connected in series to the battery 101, a charging device 111 connected in parallel to the switch 102 and including a resistor 104 and a switch 103, an inverter module 105, a condenser 106, and an electrically driven compressor 110.

The inverter module 105 is configured by molding, into a mold package 115, a switching element group 112 comprising a switching element 114 and an unshown diode to absorb a switching surge. This switching element group 112 converts a DC voltage from the battery 101 into a three-phase pseudo AC voltage, and applies it to the electrically driven compressor 110 to drive a motor of the electrically driven compressor 110.

Furthermore, the resistor 104 of the charging device 111 restricts an incoming current through the condenser 106 and an incoming current generated in the condenser 106 when the DC voltage of the battery 101 is applied. That is, the presence of the resistor 104 makes it possible to, when the battery 101 is connected, open the switch 102, close the switch 103, and pass a current via the resistor 104, thereby restricting the incoming current produced when the voltage of the battery 101 is applied. This can prevent a disadvantage where a high current or high voltage is applied to the inverter module 105 to damage the switching element group 112 and the like in the inverter module 105 (e.g., refer to Japanese Patent Publication Laid-open No. 3341327).

On the other hand, in such an air conditioner, the switch 102 might be welded to remain in a closed state despite a command being issued by an unshown controller to open the switch 102. Thus, heretofore, voltage dividing resistors have been provided before and after the switch 102, and terminal voltages of these voltage dividing resistors have been detected to check the occurrence of welding of the switch 102, but the provision of the voltage dividing resistors has posed a problem of increased installation space.

SUMMARY OF THE INVENTION

The present invention has been attained to solve the foregoing problem of prior art, and it is an object of the present invention to provide an inverter module capable of reducing installation space.

That is, the inverter module of the present invention comprises a switching element group provided in a mold package to convert a DC voltage into a three-phase pseudo AC voltage by switching, wherein resistors to detect voltages before and after a switch connected in serial to a DC power source are integrally molded into the mold package.

According to the present invention, in an inverter module comprising a switching element group provided in a mold package to convert a DC voltage into a three-phase pseudo AC voltage by switching, resistors to detect voltages before and after a switch connected in serial to a DC power source are integrally molded into the mold package, so that, as compared to the case where the resistors to detect the voltages before and after the switch are provided in an external substrate, a significant size reduction can be achieved and installation space can be reduced. Moreover, the molding allows heat release of the resistors and also allows an insulation distance to be secured at the same time, which makes it possible to configure a high-performance inverter module.

Furthermore, in the inverter module of the present invention, there are provided, in the above-described invention, pins to connect the resistors to circuits before and after the switch, and pins to output terminal voltages of the resistors.

In this invention, in addition to the above, there are provided pins to connect the resistors to circuits before and after the switch, and pins to output terminal voltages of the resistors, so that it is possible to connect the resistors and the switch without trouble. Moreover, the pins to output the terminal voltages of the resistors are used to output the terminal voltages to the outside, and the voltages before and after the switch can thus be detected without trouble.

DETAILED DESCRIPTION OF THE PREFERRED EMBODIMENT

An embodiment of the present invention will be described below in detail with reference to the drawings.

Figure 1:
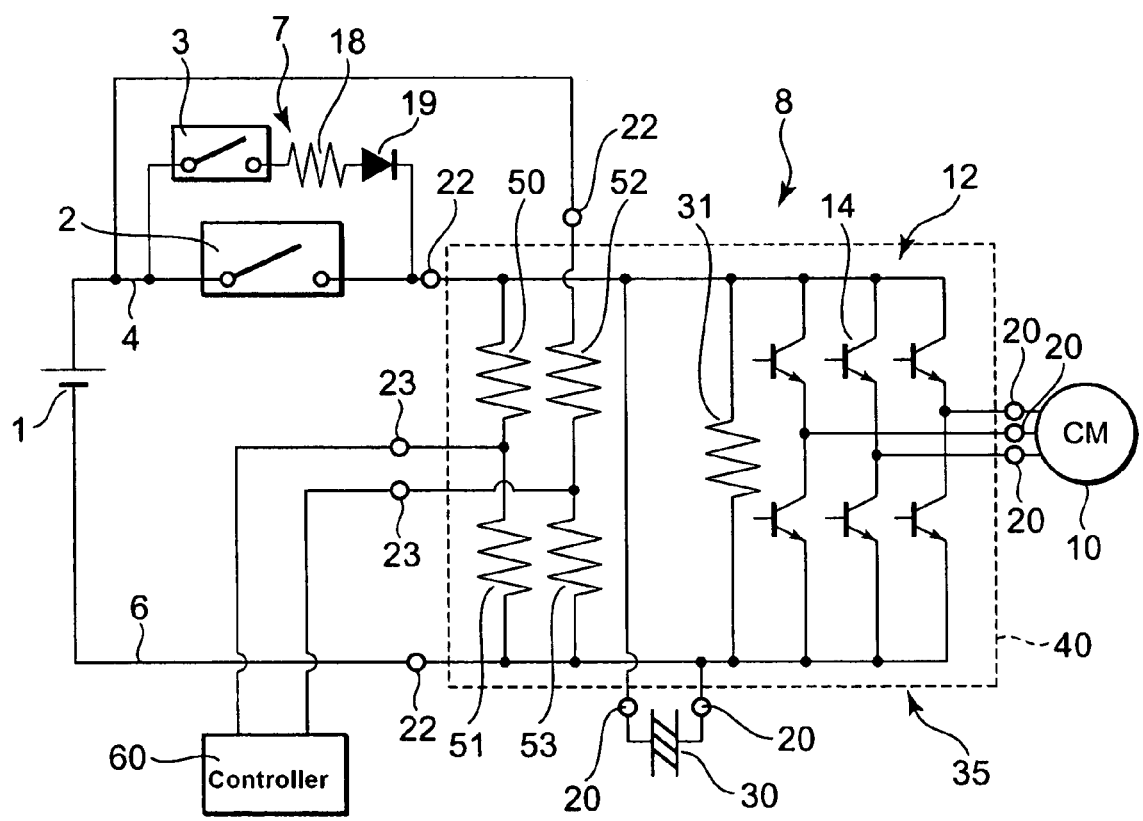
FIG. 1 is an electric circuit diagram of one embodiment of an air conditioner for an electric automobile comprising an inverter module of the present invention.
Figure 2:
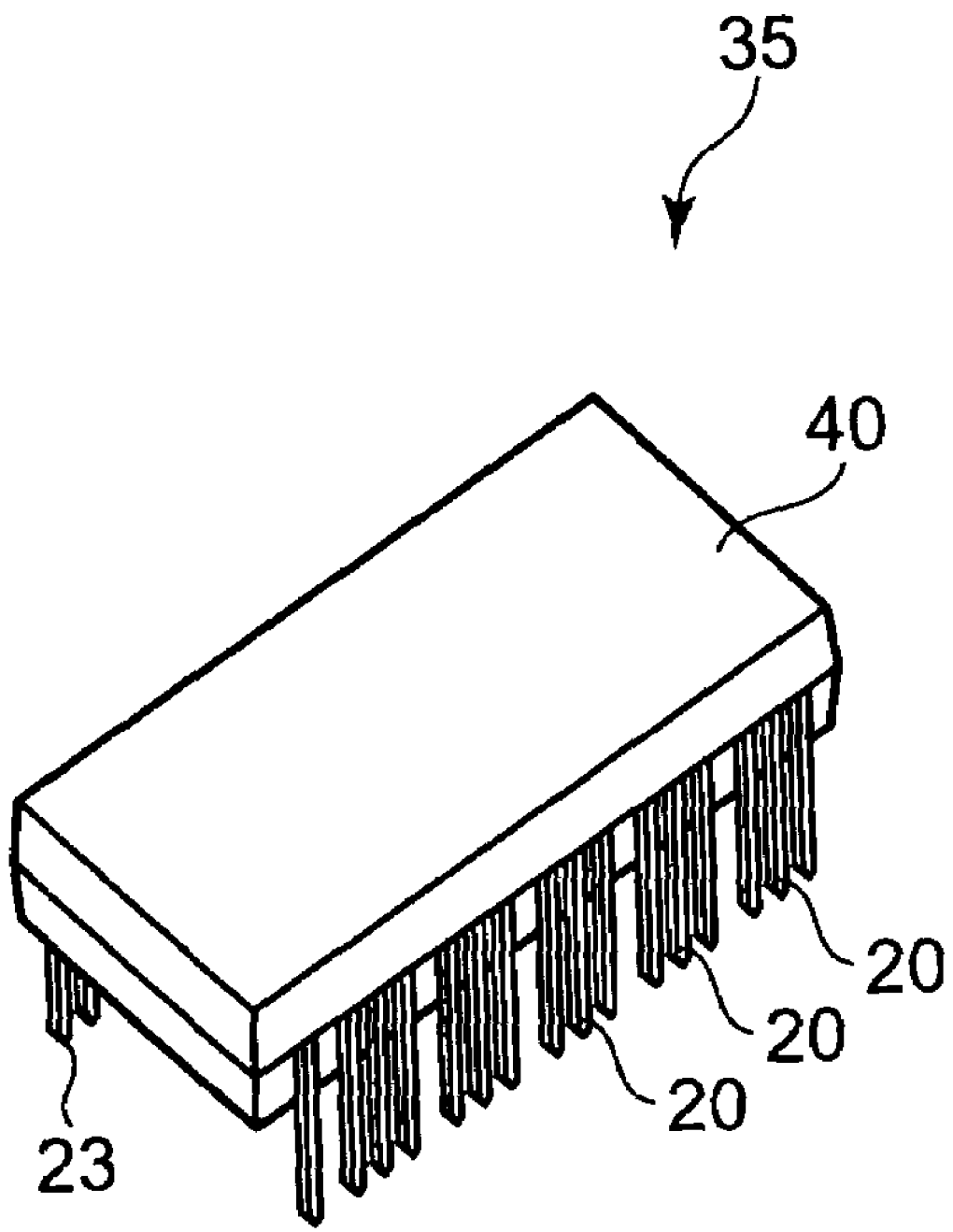
FIG. 2 is a perspective view of the inverter module molded in a mold package.
Figure 3:
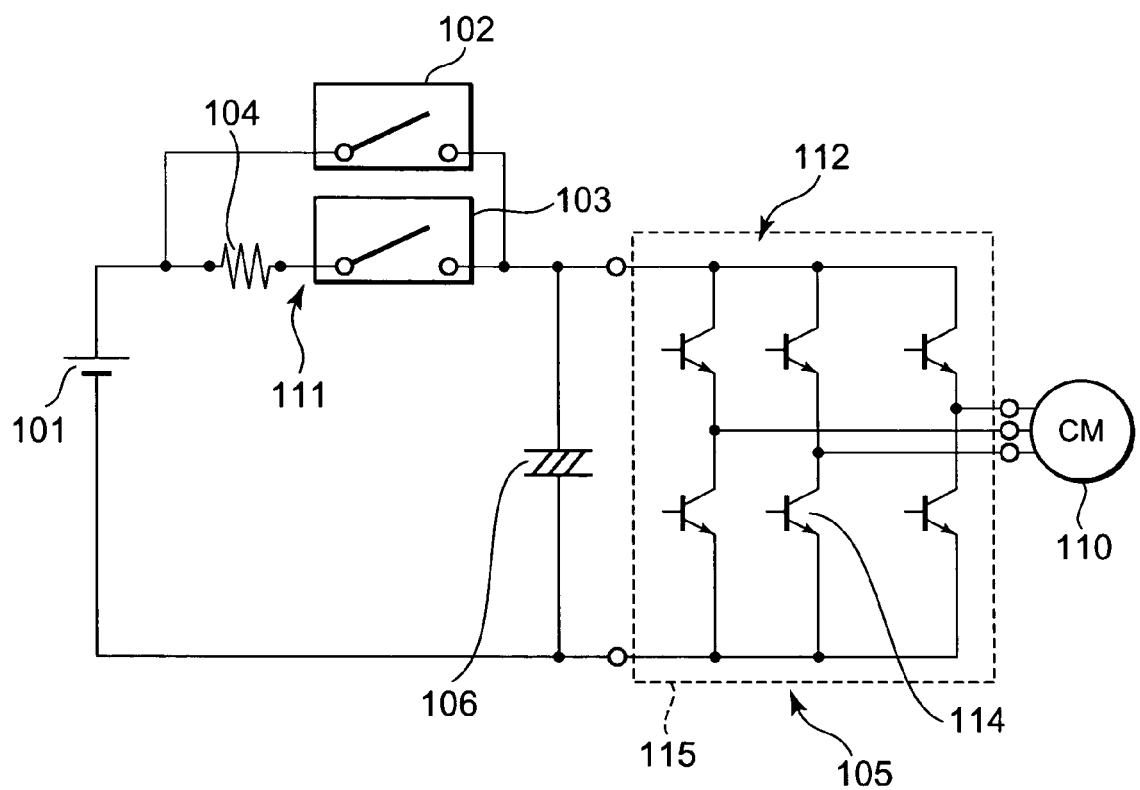
FIG. 3 is an electric circuit diagram of an air conditioner for an electric automobile comprising a conventional inverter module.

In FIG. 1, 1 is a main battery of an electric automobile, and this provides a DC power source to an electrically driven compressor 10 of an air conditioner via an inverter device 8 comprising a switch 2, a charging circuit 7, a condenser 30, a discharging resistor 31, an inverter module 35 of the present invention and the like. A DC voltage is output from the battery 1, but a voltage converted into a three-phase pseudo AC is supplied to the electrically driven compressor 10 by the inverter module 35 described later.

The above-described inverter module 35 comprises a switching element group 12 provided in a mold package 40 to convert a voltage into a three-phase pseudo AC voltage by switching. This switching element group 12 comprises a switching element 14 and an unshown diode to absorb a switching surge, and is connected between a positive line 4 (DC about +300 V) and a negative line 6 of the battery 1.

The switch 2 is connected to the positive line 4 between the battery 1 and the switching element group 12. The condenser 30 stably supplies a voltage to the switching element group 12, and is connected between the positive line 4 that is between the switch 2 and the switching element group 12, and the negative line 6. The discharging resistor 31 discharges the charged condenser 30, and is connected between the positive line 4 that is between the condenser 30 and the switching element group 12, and the negative line 6. This resistor 31 is molded into the mold package 40.

The charging circuit 7 comprises a serial circuit of a switch 3, a positive characteristic thermister 18 and a diode 19, and is connected in parallel to the switch 2. This charging circuit 7 restricts an incoming current through the condenser 30 and an incoming current generated in the condenser 30 when the voltage of the battery 1 is applied.

That is, a controller 60 of the inverter device 8, in accordance with an operation instruction from an unshown controller of the air conditioner, first closes the switch 3 while the switch 2 is opened (split), and passes a current from the battery 1 to the condenser 30 via the positive characteristic thermister 18 and the diode 19, thus charging the condenser 30. The positive characteristic thermister 18 heats by itself to increase a resistance value, and thus serves to restrict an increase in a value of a flowing current. This restricts the incoming current and protects the condenser 30 and the switching element group 12.

Next, the controller 60 closes the switch 2 at the moment when the charging of the condenser 30 is completed, and then opens the switch 3 of the charging circuit 7, and after this, the voltage of the battery 1 is applied to the switching element group 12 via the switch 2. The controller 60 controls the turning on/off of the switching element 14 of the switching element group 12 to generate a three-phase pseudo AC voltage at a predetermined frequency, and applies it to a motor of the electrically driven compressor 10 to drive the same.

Then, in accordance with an operation specifying instruction from the controller of the air conditioner, the controller 60 opens the switch 2 (split), and stops the operation of the electrically driven compressor 10. It is to be noted that the diode 19 is directed forward to the condenser 30 side, and serves to prevent inconveniences in which the condenser 30, the switching element group 12 and the like are damaged, for example, when the battery 1 is reversely connected or in which a person gets an electric shock when his/her hand touches a terminal at the battery 1.

Furthermore, the inverter module 35 of the present invention has built-in voltage dividing resistors 50, 51, 52, 53 to detect voltages before and after the switch 2. That is, a serial circuit (voltage detection circuit) of the resistors 50 and 51 is connected between the positive line 4 which is located between the switch 2 and the subsequent switching element group 12, and the negative line 6 of the battery 1.

Moreover, a serial circuit (voltage detection circuit) of the resistors 52 and 53 is connected between the positive line 4 which is located between the switch 2 and the previous battery 1, and the negative line 6. The resistors 50 and 51 detect the voltage of a back end of the switch 2, and the resistors 52 and 53 detect the voltage of at a previous step of the switch 2.

Furthermore, in the embodiment, the resistors 50 and 52 have the same resistance value, and the resistors 51 and 53 also have the same resistance value. The resistance value of the resistors 50 and 52 is sufficiently greater than that of the resistors 51 and 53 connected to the negative line 6 side thereof. A terminal voltage of the resistors 51 and 53 is then input to the controller 60.

Here, in a state where the battery 1 is connected, a terminal voltage V1 of the resistor 53 input to the controller 60 is substantially the voltage of the battery 1, regardless of whether the switch 2 is opened or closed. In a state the condenser 30 is completely discharged, a terminal voltage V2 of the resistor 51 input to the controller 60 will be 0 (GND) if the switch 2 is opened, and the voltage V2 will be substantially the voltage V1 (with a slight voltage drop) when the switch 2 is closed. This makes it possible to detect whether the switch 2 is opened or closed from the terminal voltages V1, V2 of the resistors 51, 53 input to the controller 60. It is thus possible to judge the state where the switch 2 is closed even though the switch 2 is controlled to be opened by the controller 60, the so-called welding of the switch 2.

Furthermore, in the present invention, the above-described voltage dividing resistors 50, 51, 52, 53 for voltage detection are integrally molded in the mold package 40 together with the switching element group 12.

Here, the resistors to check the welding have heretofore been disposed on a circuit board, which has caused a problem that the inverter device is enlarged. On the other hand, if the inverter device is installed on a vehicle to drive the electrically driven compressor of the air conditioner for the electric automobile as in the present embodiment, it is necessary to reduce its size because it has to be placed in a small engine room having limited installation space.

Therefore, the voltage dividing resistors 50, 51, 52, 53 are integrally molded in the mold package 40 as in the present invention, so that the inverter device 8 can be significantly reduced in size. In this way, the installation space for the inverter device 8 comprising the inverter module 35 can be reduced.

Furthermore, the molding of the resistors 50, 51, 52, 53 also allows heat release of the resistors 50, 51, 52, 53 to be performed by heat release means (such as a heat release fin) of the inverter module 35. Thus, it is not necessary to place extra heat release means for the heat release of the resistors, and the number of components can be reduced. Further, insulation distances of the resistors can be secured. It is thus possible to provide the high-performance inverter module 35.

It is to be noted that pins 20 . . . are attached to the mold package 40 to connect the switching element group 12 and the discharging resistor 31 in the mold package 40, the battery 1 outside the mold package 40, and the switch 2 and electrically driven compressor 10.

The pins 20 . . . allow the devices inside and outside the mold package 40 to be connected without trouble. Further, to the mold package 40, there are also attached pins 22 . . . to connect the resistors 50, 51, 52, 53 in the mold package 40 to circuits before and after the switch 2, and pins 23, 23 connected to the controller 60 to output the terminal voltages V1, V2. In this way, even if the resistors 50, 51, 52, 53 are provided in the mold package 40 as in the present invention, the pins 22 . . . allow the resistors 50, 51, 52, 53 to be connected before and after the switch 2 without trouble, and the pins 23, 23 allow the terminal voltages of the resistor 51 and the resistor 53 to be output to the controller 60 without trouble.

What is claimed is:

1. An inverter module comprising:
   a switching element group provided in a mold package to convert a DC voltage into a three-phase pseudo AC voltage by switching,
   a plurality of resistors integrally molded into the mold package, a first one of the resistors coupled to a first node joining the DC power source and a mechanical switch, a second one of the resistors coupled to a second node joining the mechanical switch and the invertor module,
   wherein said plurality of resistors provide output voltages corresponding to voltages at the first and second nodes.

2. The inverter module according to claim 1, further comprising:
   pins to connect the first and second resistors to the first and second nodes, respectively, and pins to output terminal voltages of the resistors.

* * * * *